United States Patent [19]

Myers

[11] Patent Number: 4,741,232

[45] Date of Patent: May 3, 1988

[54] APPARATUS FOR USE IN MACHINING WORKPIECES

[75] Inventor: Carl J. Myers, Mentor, Ohio

[73] Assignee: The Warner & Swasey Company, Cleveland, Ohio

[21] Appl. No.: 927,758

[22] Filed: Nov. 6, 1986

[51] Int. Cl.⁴ .......................................... B23B 13/02
[52] U.S. Cl. .................... 82/2.7; 29/27 C; 82/34 R
[58] Field of Search ............... 82/2 R, 2.5, 2.7, 2 D, 82/34 R, 32; 29/563, 27 R, 27 C, DIG. 56–60; 409/235; 408/234

[56] References Cited

U.S. PATENT DOCUMENTS

| | | | |
|---|---|---|---|
| 2,655,067 | 10/1953 | Bechler | 82/34 R |
| 3,029,710 | 4/1962 | Fotsch et al. | |
| 3,635,109 | 1/1972 | Jacobson | 82/2 D |
| 3,658,190 | 4/1972 | Fournier | 82/2.5 |
| 3,791,258 | 2/1974 | Krall et al. | |
| 3,797,362 | 3/1974 | Heckman | |
| 3,901,180 | 8/1975 | Allen et al. | |
| 3,999,645 | 12/1976 | Kaulfuss | |
| 4,287,798 | 9/1981 | Cooper, Jr. et al. | |
| 4,302,144 | 11/1981 | Hallqvist | 82/2.5 |
| 4,316,398 | 2/1982 | Link et al. | |
| 4,430,041 | 2/1984 | Hemingway et al. | |
| 4,442,739 | 4/1984 | Swanson et al. | 82/2.5 |

FOREIGN PATENT DOCUMENTS

| | | | |
|---|---|---|---|
| 3026791 | 12/1981 | Fed. Rep. of Germany | 82/2.7 |
| 2547221 | 12/1984 | France | 82/2.7 |
| 164402 | 12/1980 | Japan | 82/2.7 |
| 76702 | 5/1984 | Japan | 82/2.7 |

*Primary Examiner*—Fred Silverberg
*Attorney, Agent, or Firm*—Calvin G. Covell; Raymond J. Eifler

[57] ABSTRACT

An apparatus for use in machining a workpiece includes a housing (102) which is operable between a closed condition enclosing a chuck (101) and an open condition. When the housing (102) is in the open condition, an opening (117) extends across the top of the housing and down opposite sides of the housing to provide access to the chuck (101) from both sides of the housing. A workpiece transfer assembly (200) has a downwardly extending structure (204) which is movable along a path (A) extending through the housing (102) when the housing is in the open condition. This enables the transfer structure (200) to move unfinished workpieces (W) to the chuck (101) from one side of the housing and to move finished workpieces from the chuck to the opposite side of the housing. The transfer structure is supported on tracks (201) which extend above the housing.

5 Claims, 2 Drawing Sheets

APPARATUS FOR USE IN MACHINING WORKPIECES

This invention relates to an improved apparatus for use in machining workpieces. More specifically, the present invention relates to an apparatus which includes a transfer assembly which is operable to move workpieces to and from a machine tool.

A known apparatus for use in machining workpieces includes a chuck which grips and rotates a workpiece during a machining operation. An infeed conveyor is disposed adjacent to a first side of the chuck and transports unfinished workpieces to a transfer mechanism which moves the workpieces from the infeed conveyor to the chuck. When the machining operations on a workpiece have been completed, the finished workpiece is moved from the chuck to an outfeed conveyor by the transfer mechanism. The infeed and outfeed conveyors are both located on the same side of the chuck. One example of such an apparatus for use in machining workpieces is shown in U.S. Pat. No. 4,316,398, entiled Loading and/or Unloading Device for Machine Tools, Particularly Automatic Lathes, issued Feb. 23, 1982.

An apparatus for use in machining workpieces and constructed in accordance with the present invention includes a transfer assembly which is movable through an opening in the top and sides of a machine tool housing to transfer workpieces to and from a chuck. The transfer assembly includes a workpiece transfer structure which extends downwardly from above the housing toward the chuck. When the housing is in an open condition, the transfer structure is movable through the opening to either side of the machine tool housing. This increases the versatility of the machine tool by enabling it to be set up to have workpieces transferred between the chuck and opposite sides of the housing or to have workpieces tranferred between the chuck and either one of the opposite sides of the housing.

DETAILED DESCRIPTION OF THE INVENTION

Figure 1:
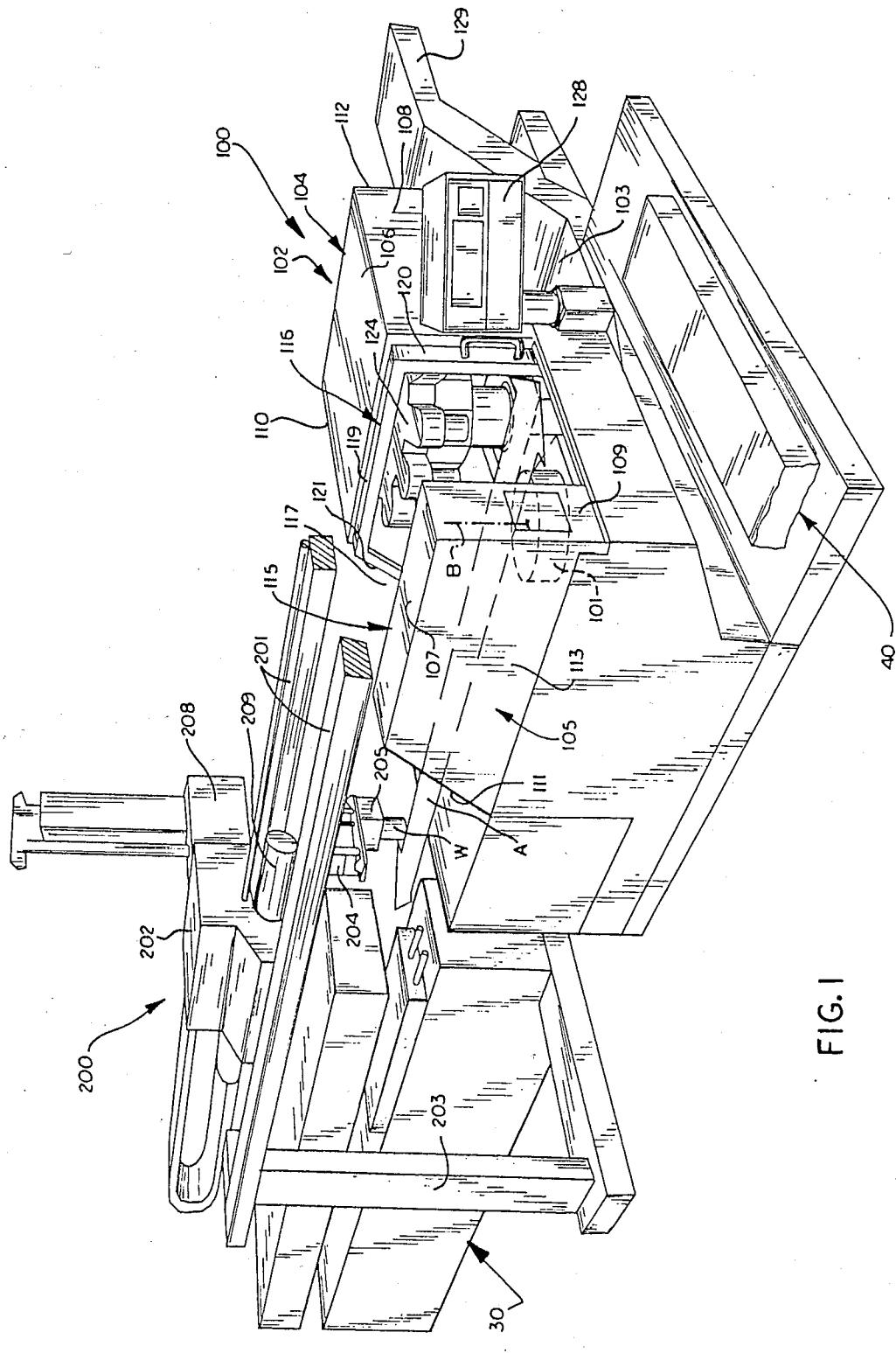
Figure 2:
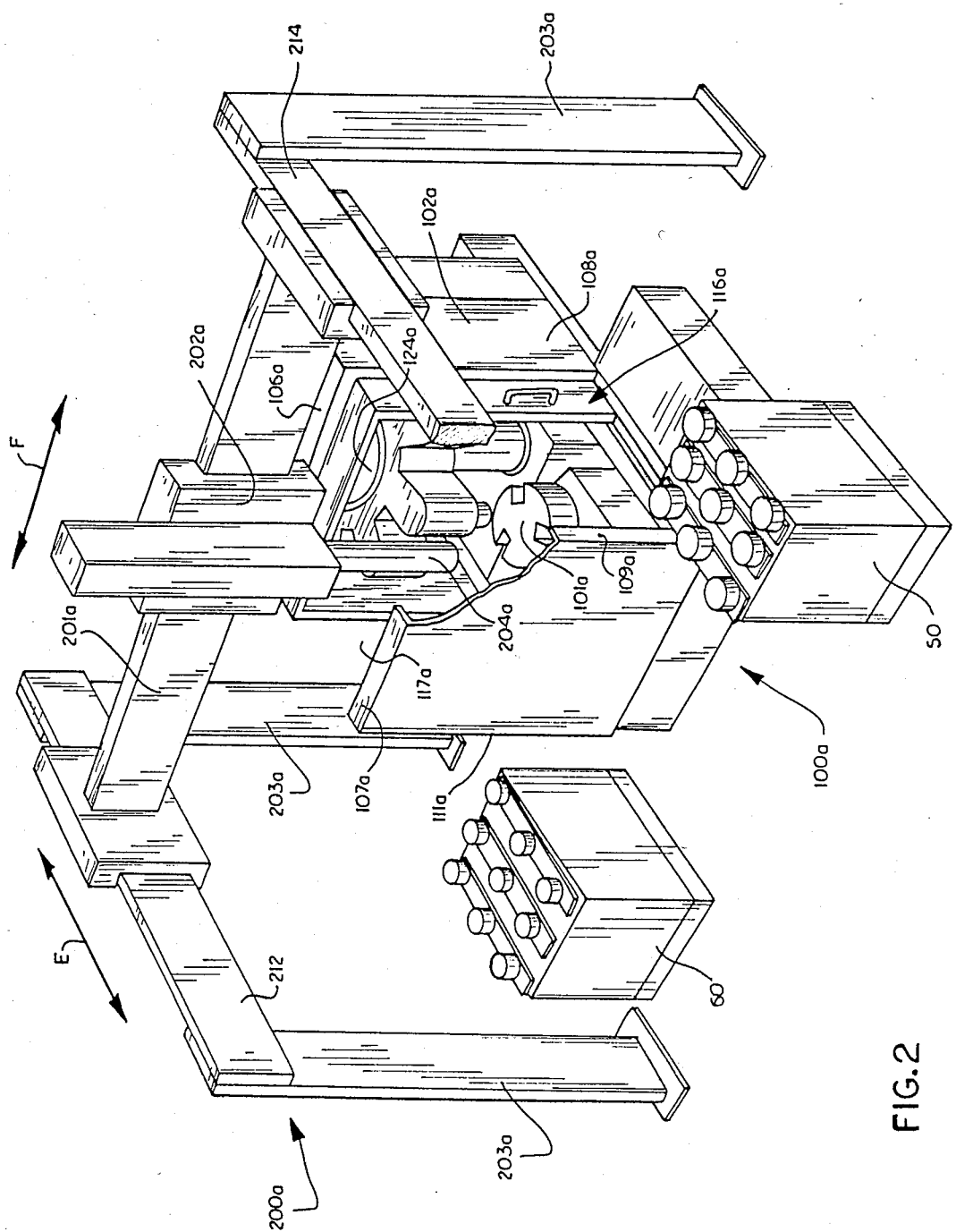

FIG. 1 is a pictorial illustration depicting the relationship between a machine tool and a workpiece transfer assembly; and FIG. 2 is a schematic illustration depicting the relationship between a machine tool and a second embodiment of the workpiece transfer assembly.

Referring now to the drawings, FIG. 1 illustrates a machine tool 100 which is operable to perform machining operations on workpieces W. A workpiece transfer assembly 200 transports unfinished workpieces W from an infeed conveyor assembly 30 to a chuck 101 in the machine tool 100. The workpiece transfer assembly 200 transports finished workpieces W from the chuck 101 to an outfeed conveyor assembly 40. Thus, the transfer assembly 200 is operable to move workpieces to and from the chuck 101 along a linear path which extends through the machine tool 100 and is indicated schematically by an arrow A in FIG. 1.

The machine tool 100 includes a housing 102 which is operable between a closed condition enclosing the chuck 101 and an open condition, illustrated in FIG. 1. The housing 102 includes a base 103 with upwardly extending main sections 104 and 105. The main sections 104 and 105 of the housing have horizontal upper or top sides 106 and 107 which are supported by front side walls 108 and 109, back side walls 110 and 111, and end walls 112 and 113.

When a sliding door 116 is in the open position shown in FIG. 1, there is an opening 117 which extends across the top of the housing 102 and down opposite sides of the housing to the base 103. The sliding door 116 has a top or upper panel 119, a front side panel 120 and a rear side panel 121.

When the sliding door 116 is in a closed position blocking the opening 117, the top panel 119 extends between the upper sides 106 and 107 of the housing. The front panel 120 of the door 116 extends between the front side walls 108 and 109 of the housing. The rear panel 121 of the door 116 extends to the back side walls 110 and 111 of the housing. Thus, when the sliding door 116 is closed, the opening 117 is blocked so that the chuck 101 is fully enclosed by the housing 102.

When the door 116 is open, as illustrated in FIG. 1, there is a rectangular opening between the two back walls 110 and 111 of the housing 102. The rectangular opening in the back wall of the housing 102 is continued by a rectangular opening between the upper or top sides 106 and 107 of the housing. The opening in the top of the housing 102 is continuous with a rectangular opening formed between the front side walls 108 and 109 of the housing.

A turret 124, upon which a plurality of cutting tools are disposed, is located in the housing 102. The turret 124 is rotatable about a vertical axis extending parallel to a vertical axis B of rotation of the chuck 101. In addition, the turret 124 is movable vertically along the axis of rotation of the turret. The turret 124 is also movable horizontally toward and away from the axis B of rotation of the chuck. Tools are mounted on the turret 124 to cut a workpiece in a known manner as the workpiece is being rotated by the chuck 101. Although the illustrated machine tool 100 is a vertical chucker, the machine tool 100 could have a different construction if desired.

A control assembly 128 is provided at the front of the machine tool 100 to control machining operations. During the machining operations, chips cut from a workpiece being rotated by the chuck 101 by tools on the turret 124 are carried away from the lower portion of the machine tool by a chip conveyor assembly 129.

The transfer assembly 200 includes horizontal overhead tracks 201 along which a carriage 202 is movable. The tracks 201 are supported by a plurality of vertical posts 203. Although only one of the posts 203 has been shown in FIG. 1, it should be understood that there are support posts at each end of the tracks 201.

A transfer structure 204 extends downwardly from the carriage 202. A workpiece gripper assembly 205 is disposed at the lower end of the transfer structure 204. The transfer structure 204 can be extended and retracted to move the gripper assembly 205 vertically up and down, that is toward and away from the tracks 201. A transfer structure drive assembly 208 is connected with the carriage 202 and the transfer structure 204. The drive assembly 208 is operable to raise and lower the transfer structure 204 and gripper assembly 205.

A drive motor 209 is connected with the carriage 202 and is operable to move the carriage 202 along the tracks 201. The overhead tracks 201 extend from a location over the infeed conveyor assembly 30 across the machine tool 100 to a location above the outfeed conveyor assembly 40. The infeed conveyor assembly 30, chuck 101 and outfeed conveyor assembly 40 are all disposed along the linear path indicated by the arrow A in FIG. 1. Therefore, when the door 116 is in the open condition illustrated in FIG. 1, the carriage 202 can be moved along the overhead tracks 201 to move workpieces W between the infeed conveyor assembly 30, the chuck 101 and the outfeed conveyor assembly 40.

OPERATION

When the apparatus of FIG. 1 is to be used to machine a workpiece W, the carriage 202 is moved to the left (as viewed in FIG. 1) end of the tracks 201 by operation of the drive motor 209. The transfer structure 204 is then lowered to enable the gripper 205 to engage a raw or unfinished workpiece W at the infeed conveyor 30. The drive assembly 209 is then operated to move the carriage 202 to a position over the chuck 101.

As the carriage moves from the infeed conveyor 30 to a position over the chuck 101, the downwardly extending transfer structure 204 enters the housing 102 through the portion of the opening 117 between the back walls 110 and 112 of the housing 102. Continued movement of the carriage toward the chuck 101 moves the transfer structure 204 thorugh the portion of the opening 117 between the top sides 106 and 107 of the housing 102. When the transfer structure 204 and workpiece W are in vertical alignment with the chuck 101, rightward (as viewed in FIG. 1) movement of the carriage 202 is stopped.

The drive assembly 208 is then operated to lower the transfer structure 204 and position the workpiece W at the center of the chuck 101. After the workpiece W has been released by the gripper 205, the drive assembly 209 is operated to move the carriage 202 leftwardly (as viewed in FIG. 1). This moves the transfer structure 204 out of the machine tool 100. The sliding door 116 then moves to a closed condition blocking the opening 117 and enclosing the chuck 101 and turret 124. The machine tool 100 is then operated to machine the workpiece W in a known manner.

Once the machining operations on the workpiece W have been completed, the door 116 is moved back to the open condition of FIG. 1. The drive assembly 209 then moves the carriage 202 along the track 201 to a position over the chuck 101. The transfer structure 204 and gripper 205 are then in vertical alignment with the chuck 101. The transfer structure 204 is lowered slightly and the gripper 205 engages the finished workpiece W.

Once the gripper 205 has engaged the workpiece W, the transfer structure 204 is raised slightly to move the finished workpiece out of engagement with the chuck 101. Movement of the downwardly extending transfer structure 204 through the opening 117 is then continued in a rightward direction (as viewed in FIG. 1) by movement of the carriage 202 along the overhead tracks 201. The transfer structure 204, gripper 205 and finished workpiece W are moved out of the machine tool 100 through the portion of the opening 117 between the front walls 108 and 109 of the housing 102.

After the transfer structure 204 and finished workpiece W have moved out of the housing 102 and into vertical alignment with the outfeed conveyor 40, the transfer structure 204 is lowered to deposit the finished workpiece W on the outfeed conveyor. The transfer structure 204 is then raised and the carriage is moved leftwardy (as viewed in FIG. 1) along the tracks 201 to the infeed conveyor 30. As this occurs, the downwardly extending transfer structure 204 moves through the opening 117 in the housing 102. The transfer assembly 200 is then operated to engage a next succeeding unfinished workpiece W and move it to the chuck 101 in the manner previously explained.

Since the opening 117 extends through the upper side walls 106 and 107, front side walls 108 and 109 and rear side walls 110 and 111, a downwardly extending transfer structure 204 can be moved along the tracks 201 between the front and back sides of the machine tool 100. This allows the infeed conveyor assembly 30 to be mounted on one side, that is at the back of the machine tool 100, and the outfeed conveyor assembly 40 to be mounted on the opposite side of the machine tool, that is, at the front of the machine tool. However, if desired, the infeed and outfeed conveyors 30 and 40 could both be mounted at the back of the machine tool 100 or could both be mounted at the front of the machine tool 100.

ALTERNATIVE EMBODIMENT

In the embodiment of the invention illustrated in FIG. 1, the carriage 202 can only be moved along a single axis, that is an axis extending parallel to the stationary tracks 201. In the embodiment of the invention shown in FIG. 2, the carriage for the transfer structure is movable along a pair of perpendicular axes. Since the embodiment of the invention illustrated in FIG. 2 is generally similar to the embodiment of the invention illustrated in FIG. 1, similar numerals will be utilized to designate similar components, the suffix letter "a" being associated with the numerals of FIG. 2 in order to avoid confusion.

A machine tool 100a (FIG. 2) has a housing 102a with an opening 117a which extends through the housing. Thus, the opening 117a extends between upper top side walls 106a and 107a, front side walls 108a and 109a, and back or rear side walls. Although only the rear side wall 111a shown in FIG. 2, there is a second rear side wall corresponding to the side wall 110 of FIG. 1.

A sliding door 116a is movable between the open condition shown in FIG. 2 and a closed condition. When the door 116 is open, the opening 117a is open to provide access to a chuck 101a. When the door 116a is closed, the housing 102a encloses the chuck 101a and a turret 124a. The machine tool 100a is of the type commonly called a vertical chucker and is of the same general construction as the machine tool 100 of FIG. 1.

The workpiece transfer assembly 200a includes a movable horizontal track 201a which extends over the machine tool 100a. The track 201a is movable along a pair of horizontal side tracks 212 and 214 which are supported by upright posts 203a. The carriage 202a is movable along the track 201a. A transfer structure 204a extends downwardly from the carriage 202 and has a suitable gripper (not shown) for engaging a workpiece.

Unfinished or raw workpieces are held in a support stand 50 disposed in front and to one side of the machine tool 100a. Finished or machined workpieces are held in a support stand 60 disposed in the rear and to one side of the machine tool 100a. Of course, if desired, an infeed conveyor assembly, similar to the infeed conveyor 30 of FIG. 1 and an outfeed conveyor assembly, similar to the outfeed conveyor assembly 40 of FIG. 1 could be substituted for the support stands 50 and 60.

The main or central rail 201a is movable back and forth, as indicated by the arrow E in FIG. 2, along the stationary side tracks 212 and 214. The carriage 202a is movable back and forth along the track 201a, as indicated by the arrow F in FIG. 2. Therefore, the carriage 202a and transfer structure 204a can be moved back and forth along the axis indicated by the arrow E and along the axis indicated by the arrow F. However, the downwardly extending transfer structure can only be moved for a relatively small distance along the axis E when the transfer structure 204a is extending downwardly into the machine tool 100a.

Since the carriage 202a and transfer structure 204a can be moved along two axes, indicated by the arrows E and F, the transfer structure can be moved to any desired location around the machine tool 100a. This enables the workpiece support stands 50 and 60 to be located in almost any desired position relative to the machine tool 100a.

I claim:

1. An apparatus for use in machining workpieces, said apparatus comprising a base (103), chuck means (101) connected with said base for holding a workpiece (W), a housing (102) connected with said base and having a top (106, 107) and plurality of sides (108, 109, 110, 111, 112, 113), said housing being operable between a closed condition enclosing said chuck means and an open condition, transfer means (200) for moving workpieces to and from said chuck means when said housing is in the open condition, said apparatus being characterized by said housing (102) including means for defining an opening (117) which extends across the top (106,107) of said housing and down opposite sides (108, 109, and 110, 111) of said housing when said housing is in the open condition, door means (116) which extends across the top and down opposite sides of said housing to block said opening and to block the path of movement of said transfer means when said housing is in the closed condition, said door means being ineffective to block said opening when said housing is in the open condition, said transfer means including a transfer structure (204) which extends downwardly from a level above the top of said housing to a level below the top of said housing and adjacent to the level of an upper portion of said chuck means (101) and means (202) for moving said transfer structure from one side of said housing into the opening (117) and for moving the transfer structure from the opening to the side of said housing opposite said one side when said housing is in the open condition to transfer workpiece (W) to and from said chuck means.

2. An apparatus as set forth in claim 1 wherein said transfer means (200) includes overhead track means (201) for supporting said transfer structure (204) for movement along the path (A) extending through said housing when said housing is in the open condition.

3. An apparatus as set forth in claim 1 wherein said chuck means (101) includes means for rotating a workpiece about a vertical axis, said path of movement is a linear path (A) extending through said housing (102) and perpendicular to the axis of rotation of the workpiece.

4. An apparatus for use in machining workpieces (W), said apparatus comprising a base (103), a housing (102) connected with said base and having a front wall (108), a rear wall (110) disposed on a side of said housing opposite from said front wall, and a top wall (106) extending between said front and rear walls, said housing including surface means for defining a continuous opening (117) which extends across said top wall of said housing and down said front and rear walls of said housing, door means (116) operable between a closed condition blocking said opening and an condition in which said door means is out of said opening and said opening is unblocked, said door means including rear panel means (121) for blocking the portion of said opening (117) in said rear wall (110) when said door means is in the closed condition, front panel means (120) for blocking the portion of said opening (117) in said front wall (108) when said door means is in the closed condition, and top panel means (119) for blocking the portion of said opening in said top wall (106) when said door means is in the closed condition, chuck means (101) connected with said base and disposed in said housing for rotation a workpiece (W) about a vertical axis (B) which extends through the portion of said opening (117) in said top wall (106) of said housing, transfer means (200) for transporting workpieces between a rear location (30) outside of said housing and adjacent to said rear wall of said housing, a front location (40) outside of said housing and adjacent to said front wall of said housing and chuck means (101) along a path extending through said opening (17) in said housing in a direction transverse to the axis (B) of said chuck means when said door means (116) is in the open condition, said transfer means including overhead track means (201) disposed at a level above said top wall (106) of said housing and extending from said rear location (30) across said housing to said front location (40), carriage means (202) movable along said track means (201) and across said housing (102) between said rear location (30) and said front location (40), a transfer structure (204) extending downwardly from said carriage means (202), gripper means (205) at a lower end portion of said transfer structure for engaging a workpiece (W) at one of said front and rear locations with said gripper means at a level which is lower than the top wall (106) of said housing, for releasing a workpiece (W) at said chuck means (101) with said gripper means (105) at a level which is lower than said top wall (106) of said housing, for engaging a workpiece (W) at said chuck means (101) with said gripper means (205) at a level which is lower than said top wall (106) of said housing, and for releasing a workpiece (W) at one of said front and rear locations with said gripper means at a level which is lower than said top wall (106) of said housing (102), and drive means (209) for moving said transfer structure through the portion of said opening (117) in said top wall (106) of said housing, for moving said gripper means (205) through the portion of said opening (117) in said rear wall (110) of said housing, and for moving said gripper means (205) through the portion of said opening (117) in said front wall (108) of said housing, said drive means being operable to move said carriage means (202) along said track means (201) between said front and rear locations with said gripper means (205) at a level which is lower than said top wall (106) of said housing (102).

5. An apparatus as set forth in claim 4 further including rear conveyor means (30) at said rear location for transporting workpieces (W) and front conveyor means (40) at said front location for transporting workpieces, said track means (201) extending above a portion of said rear conveyor means (30) and said front conveyor means (40).

* * * * *